United States Patent [19]

Hoelle

[11] 3,884,785

[45] May 20, 1975

[54] METHOD OF MAKING DICHLOROACETYL CHLORIDE

[75] Inventor: Alfred Hoelle, Grenzach, Germany

[73] Assignee: Dynamit Nobel Aktiengesellschaft, Troisdorf, Germany

[22] Filed: Oct. 15, 1971

[21] Appl. No.: 188,663

[30] Foreign Application Priority Data

Oct. 15, 1970 Germany.............................. 2050562

[52] U.S. Cl. ................................................ 204/158
[51] Int. Cl................................................ B01j 1/10
[58] Field of Search ................................. 204/158 R

[56] References Cited

UNITED STATES PATENTS 3,630,867 12/1971 Petz ................................. 204/158 R Primary Examiner—Howard S. Williams
Attorney, Agent, or Firm—Burgess, Dinklage & Sprung

[57] ABSTRACT

Dichloroacetyl chloride is prepared from trichloroethylene, including technical grades thereof, by oxidation and irradiation by short-wave light, utilizing a catalyst which is a salt of an aliphatic nitrogenous base or an ammonium salt.

8 Claims, No Drawings

METHOD OF MAKING DICHLOROACETYL CHLORIDE

The instant invention relates to an improved method of making dichloroacetyl chloride by oxidizing trichloroethylene, whereby high yields of the desired end product are obtained in a single process step.

It is known to make dichloroacetyl chloride by reacting oxygen or oxygen-containing gases with trichloroethylene. By means of this oxidation, which is usually carried out between 15° and 100°C and by means of irradiation with short-wave light, approximately equal amounts of trichloroethylene oxide and dichloroacetyl chloride are formed, plus traces of high-boiling constituents and gaseous by-products such as hydrogen chloride, carbon monoxide and phosgene.

Depending on how this general method is modified, dichloroacetyl chloride or chloral can be made from the trichloroethylene oxide formed. According to German Pat. No. 531,579 the conversion of trichloroethylene oxide into dichloroacetyl chloride is achieved by heating or adding nitrogenous bases or activated carbon. On the other hand chloral is produced from trichloroethylene oxide in the presence of metal chlorides, preferably the chlorides of iron, antimony, titanium or aluminum.

Another process variant is specified in German Pat. No. 759,963. There the oxidation of trichloroethylene is facilitated through the addition of chlorine to the oxygen.

Both German Pat. No. 531,597 and German Pat. No. 759,963 specifically require that the trichloroethylene used be free from anti-oxygenous products and that only pure trichloroethylene can be utilized to make dichloroacetyl chloride.

U.S. Pat. No. 2,292,129 describes an oxidation method whereby trichloroethylene is first acidified by irradiating it with ultraviolet light, and only then the oxidation is carried out. High yields of trichloroethylene oxide are achieved by this method.

The German "Offenlegungsschrift" No. 1,568,547 relates to a method whereby not only pure trichloroethylene, but also a technical grade can be oxidized and yet pure dichloroacetyl chloride which does not have to be distilled is obtained. In this method the oxidation is interrupted after a given period of time and, then, the conversion of trichloroethylene oxide into dichloroacetyl chloride is effected by adding nitrogenous bases. Thereupon, the oxidation of the still unconverted trichloroethylene is completed.

A method has now been found for making dichloroacetyl chloride by oxidizing trichloroethylene in the liquid phase in the presence of organic, nitrogen-containing bases with irradiation by short-wave light, which is characterized by the fact that the reaction is carried out with salts of aliphatic nitrogenous bases and/or salts of ammonia.

By means of this method it is possible to oxidize trichloroethylene to pure dichloroacetyl chloride in one step, without interruption and without undesired heat development. Unrefined technical grade trichloroethylene can also be converted into dichloroacetyl chloride in this manner.

Surprisingly it has been found that the nitrogenous bases in the form of their salts have the capacity of steering the trichloroethylene oxidation completely towards dichloroacetyl chloride, whereas the free bases do not show any action at all under similar reaction conditions. This is evident from the following experiment: Trichloroethylene was mixed with about 0.1 percent by weight of diisopropyl amine and treated with oxygen for 30 hours at 70°C while irradiating with short-wave light. No oxidation took place. On the other hand, trichloroethylene, when mixed with the same quantity of this nitrogenous base in the form of a hydrochloride, was converted at a yield of more than 90 percent into pure dichloroacetyl chloride over the same period of time. The reaction product contained virtually no trichloroethylene oxide.

Another advantage of the method according to the invention is that the preliminary step of preparing the trichloroethylene for oxidation by acidifying or activating by adding chlorine, radical formers, etc., previously required, can be omitted. Moreover, in the new process the oxidation does not have to be interrupted in order to add an amine.

The salts of secondary and tertiary aliphatic amines are especially suitable as salts of aliphatic nitrogenous bases but, according to the invention, ammonium or quaternary ammonium salts or salts of diamines may be utilized. The preferred compounds are those in which the number of C-atoms in the longest chain is between 2 and 8. The preferred salt is the hydrochloride. Mixtures of various salts may be used as well as salts of other inorganic or organic acids, eg. dichloroacetic acid.

The salts are added to the trichloroethylene in quantities of 0.001 to 0.5 percent by weight in relation to trichloroethylene. However, it is also possible to first add the amine to the trichloroethylene and then neutralize or acidify with the acid chosen, e.g., hydrogen chloride. It is also possible to use more than 0.5 percent of the salts but for economic reasons such large quantities are not necessary.

As starting material both pure and technical grade trichloroethylene may be used. Technical grade trichloroethylene should be understood as referring to the trichloroethylene obtained in industrial manufacture following separation of other chlorination products (e.g., by distillation). Since the trichloroethylene may also contain the usual stabilizers, it is not necessary to work up the crude product, which is commercially available in stabilized form only, prior to the reaction. A low water content (to approximately 1 percent) does not interfere with the reaction according to the invention.

The method may be carried out without or with pressure, continuously or noncontinuously. Temperatures of from 20°C to boiling point may be used in the reaction, although those between 50° and 80°C are preferred.

As oxidizing agents the following are most suited: Pure oxygen or oxygen-containing gases, such as air, or oxygen-supplying compounds which are capable of cleaving a double bond. Irradiation is realized by means of the light sources commonly used for sensitizing chemical reactions, for example ultraviolet light of wave-length from 200 to 600 m$\mu$.

The reaction product is colorless in most cases and contains as impurities only unreacted trichloroethylene, less than 0.5 percent by weight of by-products, such as chloral and high-boiling constituents and, at the most, traces of trichloroethylene oxide. It may be directly processed after the reaction without refining and is utilized as an intermediate product, e.g., for the manufacture of insecticides, as dimethylo-2,2-dichlorovinylphosphate (DDVP) and other esters of phosphoric acid.

EXAMPLE 1:

A glass tube equipped with cooler and water-receiver is filled to a level of 760 mm with 1,000 ml of technical trade trichloroethylene, to which 0.1 percent by weight of diisopropyl amine hydrochloride was added. Thereupon the tube is irradiated with two ultraviolet lamps and heated to 50° to 80°C. Then a quantity of 10 liters per hour of finely divided oxygen is bubbled through the liquid.

After 30 to 57 hours respectively samples are taken and tested using a gas chromatograph. The analysis showed the following values:

| Content in | Duration of Reaction (hrs) | |
|---|---|---|
| | 30 | 57 |
| TRICHLOROETHYLENE | 2.5 | 0.1 |
| DICHLOROACETYL CHLORIDE | 97.0 | 99.6 |
| TRICHLOROETHYLENE OXIDE | 0.0 | 0.1 |
| CHLORAL | 0.0 | 0.0 |
| HIGH-BOILING CONSTITUENTS | 0.4 | 0.2 |

EXAMPLE 1A: (Comparison Example)

In the experimental apparatus described above 1,000 ml of trichloroethylene, to which 0.1 percent by weight of diisopropyl amine has been added, were treated in the same way as in example 1. After a reaction time of 30 hours using an oxygen feed rate of 10 liters/hr., no trichloroethylene had been converted.

EXAMPLES 2 and 3:

In the same experimental apparatus as described in Example 1, two samples of 1,000 ml trichloroethylene were prepared. The first was mixed with 0.1 percent by weight of diisopropyl amine hydrochloride and 3 ml of water; the second was mixed with 0.1 percent by weight of diisopropyl amine dichloroacetate. The two were treated in the same manner with 7 lts. of oxygen/hour. After a reaction time of 72 hours, the following gas chromatographic analysis resulted:

| Content in | Catalyst | |
|---|---|---|
| | diisopropyl amine hydrochloride + 3 ml H$_2$O | diisopropyl amine dichloroacetate |
| TRICHLOROETHYLENE | 1.7 | 8.2 |
| DICHLOROACETYL CHLORIDE | 96.7 | 91.6 |
| TRICHLOROETHYLENE OXIDE | 0.0 | 0.0 |
| CHLORAL | 0.2 | 0.1 |
| HIGH-BOILING CONSTITUENTS | 1.0 | 0.0 |

EXAMPLES 4 to 11:

In the same experimental apparatus as described in Example 1, the action of other amine salts was tested. 250 ml of trichloroethylene were used each time, with a reaction level of 190 mm. The quantity of oxygen passed through in each case was 7 ltrs./hr. and the reaction duration was 6 hours. In each case 0.1 percent by weight of the particular amine was used as a salt. The following table shows the results:

| Catalyst used: | trichloroethylene | Content in dichloroacetyl chloride | trichloroethylene oxide |
|---|---|---|---|
| DIISOPROPYL AMINE HYDROCHLORIDE | 83.2 | 16.7 | — |
| TRIETHYL AMINE HYDROCHLORIDE | 88.9 | 11.9 | — |
| ETHYLENE DIAMINE DIHYDROCHLORIDE | 91.8 | 3.1 | 5.1 |
| AMMONIUM CHLORIDE | 90.9 | 2.8 | 6.2 |
| DIISOPROPYL AMINE HYDROCHLORIDE + AMMONIUM CHLORIDE | 97.2 | 2.8 | — |
| ANILINE HYDROCHLORIDE | 100 | — | — |
| PYRIDINE HYDROCHLORIDE | 100 | — | — |
| N-METHYLPYRROL HYDROCHLORIDE | 100 | — | — |

This series of experiments proves that with short reaction durations, the oxidation takes place albeit at somewhat reduced reaction levels, and that other salts according to the invention have an action similar to that of diisopropyl amine hydrochloride.

In order to prove that, after a reaction time of 6 hours, equilibrium had not yet been achieved, the experiments with diisopropyl amine hydrochloride, triethyl amine hydrochloride and ethylene diamine dihydrochloride were continued for another 24 hours. The gas chromatographic analysis carried out at that point showed the following results:

| Content in | Nitrogenous Bases Used (as Salts) | | |
|---|---|---|---|
| | diisopropyl amine hydrochloride | triethyl amine hydrochloride | ethylene diamine dihydrochloride |
| TRICHLOROETHYLENE | 28.5 | 75.0 | 0.5 |
| DICHLOROACETYL CHLORIDE | 71.1 | 24.2 | 71.1 |
| TRICHLOROETHYLENE OXIDE | — | — | 22.4 |

I claim:

1. In a process of making dichloroacetyl chloride from trichloroethylene through oxidation and utilization of irradiation by short-wave light, the improvement which comprises carrying out the reaction in the presence of at least one salt selected from the group of salts of aliphatic nitrogenous bases and ammonium salts.

2. The process of claim 1 wherein the salt is a salt of a secondary or tertiary aliphatic amine.

3. The process of claim 1 wherein the number of carbon atoms in the longest chain of the aliphatic nitrogenous base salt is between 2 and 8.

4. The process of claim 1 wherein the salt that is used amounts to from 0.001 to 0.5 percent by weight of the trichloroethylene.

5. The process of claim 1 wherein the salt used is di-isopropyl amine hydrochloride.

6. The process of claim 1 wherein the trichloroethylene is of technical grade.

7. In a process of making halogenated acid chlorides from the corresponding halogenated olefines through oxidation and utilization of irradiation by short-wave light, the improvement which comprises carrying out the reaction in the presence of at least one salt selected from the group of salts of aliphatic nitrogenous bases and ammonium salts.

8. A process for preparing dichloroacetylchloride by oxidation of trichloroethylene which comprises forming a reaction mixture comprising trichloroethylene and at least one salt selected from the group consisting of salts of aliphatic nitrogenous bases and ammonium salts and adding to such reaction mixture oxygen and irradiating said reaction mixture with ultraviolet light.

* * * * *